United States Patent
Kuniyoshi et al.

(10) Patent No.: US 7,728,095 B2
(45) Date of Patent: Jun. 1, 2010

(54) ORGANIC-INORGANIC HYBRID GLASSY MATERIAL AND ITS PRODUCTION PROCESS

(75) Inventors: Minoru Kuniyoshi, Mie (JP); Toshinobu Yoko, Uji (JP)

(73) Assignee: Central Glass Company, Limited, Ube-shi (JP)

( * ) Notice: Subject to any disclaimer, the term of this patent is extended or adjusted under 35 U.S.C. 154(b) by 406 days.

(21) Appl. No.: 11/704,258

(22) Filed: Feb. 9, 2007

(65) Prior Publication Data

US 2007/0219345 A1 Sep. 20, 2007

(30) Foreign Application Priority Data

Feb. 10, 2006 (JP) .............................. 2006-033786

(51) Int. Cl.
*C08G 77/00* (2006.01)

(52) U.S. Cl. .................. 528/43; 528/401; 528/481

(58) Field of Classification Search .................. 528/43
See application file for complete search history.

(56) References Cited

U.S. PATENT DOCUMENTS

| 5,670,257 | A | * | 9/1997 | Sakai et al. | .................. 428/402 |
| 7,451,619 | B2 | * | 11/2008 | Kuniyoshi et al. | ............ 65/17.2 |
| 2005/0027083 | A1 | | 2/2005 | Kuniyoshi et al. | |
| 2005/0132748 | A1 | * | 6/2005 | Kuniyoshi et al. | ............ 65/17.2 |

FOREIGN PATENT DOCUMENTS

| EP | 1 721 925 A1 | 11/2006 |
| JP | 62-223323 A | 10/1987 |
| JP | 62-297236 A | 12/1987 |
| JP | 1-183438 A | 7/1989 |
| JP | 7-126035 A | 5/1995 |
| JP | 2005-35876 A | 2/2005 |
| WO | WO 2005/082975 A1 | 9/2005 |

OTHER PUBLICATIONS

P.A. Tick, "Water Durable Glasses With Ultra Low Melting Temperatures", Physics and Chemistry of Glasses, Dec. 1984, pp. 149-154, vol. 25, No. 6.
Kanichi Kamiya et al., "Preparation of Refractory Oxide Fibers from Metal Alcoholates—Possibility of Fiber Drawing in the Course of Hydrolysis of the Alcoholates", 1976, vol. 84, No. 12 (with partial English translation).
Masahide Takahashi et al., "Synthesis of Organic-Inorganic Hybrid Glasses through Non-Aqueous Acid-Base Reaction", New Glass, 2002, vol. 17, No. 2.
European Search Report dated Apr. 22, 2008 (Six (6) pages).

* cited by examiner

*Primary Examiner*—Randy Gulakowski
*Assistant Examiner*—Lindsay Nelson
(74) *Attorney, Agent, or Firm*—Crowell & Moring LLP

(57) ABSTRACT

There is provided a process for producing an organic-inorganic hybrid glassy material, including the sequential steps of (a) concentrating a starting sol of an organic-inorganic hybrid glassy material, thereby yielding a precursor material having meltability; (b) melting the precursor material; (c) subjecting a product of the step (b) to a heating treatment under reduced pressure; and (d) subjecting a product of the step (c) to a high-temperature heat treatment at 300° C. or higher.

13 Claims, 2 Drawing Sheets

ORGANIC-INORGANIC HYBRID GLASSY MATERIAL AND ITS PRODUCTION PROCESS

BACKGROUND OF THE INVENTION

The present invention relates to an organic-inorganic hybrid glassy material, where a raw material used in a sol-gel process is a starting material for that, and also to a process for producing the same.

With regard to materials which soften at temperatures not higher than 600° C., polymer materials, low-melting glasses, etc. have been famous and, for a long time, they have been used in many areas such as sealing and encapsulating materials, passivation glass, glaze, etc. Since their physical properties are different between polymer materials and low-melting glasses, they have been used differently depending upon the environment in which they are used. In general, in case that heat resistance and airtight property have a priority, glass has been used, while, in the field where characteristics other than heat resistance and airtight property have a priority, organic materials represented by polymer materials have been used. However, as a result of recent progress in the art, characteristics that have not been demanded up to now have received attention, and the development of materials having such characteristics has been expected.

In view of the above, the development for polymer materials where heat resistance and airtight property are enhanced and for glass where softening temperature region is made low or so-called low-melting glass has been positively carried out. Particularly in the market of electronic materials where heat resistance and airtight property are demanded, low-melting glass represented by a $PbO$—$SiO_2$—$B_2O_3$ series or $PbO$—$P_2O_5$—$SnF_2$ series glass has been a material which is indispensable in the field of sealing, coating, etc. of electronic parts. In addition, energy required for molding process or, in other words, the cost can be reduced in low-melting glass, as compared with high melting point glass, and therefore that meets the recent social demand for conservation of energy. Further, when it can be melted at a temperature at which an organic material having optical function property is not broken, its application as a host for (non-linear) optical material containing an optically functioning organic material to optical information communication devices such as optical switch is expected. As such, there has been a demand in many fields for materials having heat resistance and airtight property, which are characteristics of common melted glass, and also being apt to have various characteristics as in the case of polymer materials, and especially the expectation is concentrated upon low-melting glass. Furthermore, an organic-inorganic hybrid glass has been also receiving public attention as one of low-melting glasses.

With regard to low-melting glasses, for example, Tick glass represented by glass of an Sn—Pb—P—F—O type (see P. A. Tick, Physics and Chemistry of Glasses, Vol. 25, No. 6, pp. 149-154 (1984)) is famous, and, since it has a glass transition point at around 100° C. and also has an excellent water resistance, it has been used in some of the market. However, in this low-melting glass, since lead is contained in its main constituting components, there has been a necessity to use an alternative material due to the recent trend of environmental protection. In addition, demanded characteristic to Tick glass has been greatly changed, and at the same time the demand as such has been diversified as well.

With regard to common methods for the production of glass, melting method and low-temperature synthesis method have been known. Melting method is a method where a glass material is directly heated to melt and vitrified by quenching. Many kinds of glass are produced by this method, and low-melting glasses are also produced by this method. In the case of low-melting glass, however, there are many restrictions for glass composition that can be constituted such as that the containment of lead, alkali, bismuth, etc. is necessary for lowering its melting point.

On the other hand, with regard to a low-temperature synthesis method for noncrystalline bulks, there are sol-gel process, liquid-phase reaction method and nonaqueous acid-base reaction method. In a sol-gel process, a metal alkoxide or the like is subjected to a hydrolysis-polycondensation and subjected to a thermal treatment at a temperature that is higher than 500° C. (see K. Kamiya, S. Sakka and N. Tashiro, Yogyo Kyokaishi, 614-618, 84 (1976)), usually at 700 to 1,600° C., whereby a bulk can be produced. However, when the bulk produced by a sol-gel process is considered as a material for practical use, there have been many cases where the product becomes porous, due to decomposition and burning of organic materials, such as alcohol, which are introduced in the preparation of the starting solution, or due to evaporation and release, etc. in the heating process of decomposition gas of organic materials or water. Thus, there has been a problem in terms of heat resistance and airtight property. As such, in the production of bulk by a sol-gel process, many problems have been still left unsolved, and particularly production of low-melting glass by a sol-gel process has not been carried out.

Furthermore, a liquid-phase reaction method has a low productivity because of its low yield, and in addition it uses hydrofluoric acid or the like in its reaction system and is limited to the synthesis of a thin film at best. Accordingly, it is almost impossible to use it as a practical means for the synthesis of bulks.

A nonaqueous acid-base reaction method is a means which has been developed recently, and, although it is able to produce an organic-inorganic hybrid glass which is one of low-melting glasses (see M. Takahashi, H. Niida and T. Yoko, New Glass, 8-13, 17 (2002)), it is still in a stage of development and all kinds of low-melting glasses cannot be produced by that.

Accordingly, the production of many kinds of low-melting glasses has been carried out not by a low-temperature synthesis method but by a melting method. Therefore, due to melting of glass materials, the glass composition thereof is limited, and, with regard to low-melting glasses that can be produced, the type thereof has been very limited.

Incidentally, at present, low-melting glass is prominent as a material in view of heat resistance and airtight property, and it is often that the required physical property is demanded in a form of being represented by low-melting glass. However, the material is not limited to a low-melting glass. If the required physical property is satisfied, there is no large problem in low-melting or low-softening material other than glass.

JP 2005-35876 A, corresponding to US 2005/0132748 A1, discloses a process for producing an organic-inorganic hybrid glassy material, which has a softening point lower than that of low-melting glass, contains no lead, and has chemical durability, by using a phenyl-containing starting material used in sol-gel process.

In other prior art documents, there have been known a process for producing quartz glass fibers by a sol-gel process (see JP-A-62-297236), a process for producing titanium oxide fibers by a sol-gel process (see JP-A-62-223323), and a process for producing a semiconductor-doped matrix by a sol-gel process (see JP-A-1-183438). There has been also disclosed a low-melting glass of a $P_2O_5$—$TeO_2$—$ZnF_2$ type by a melting method (see JP-A-7-126035).

SUMMARY OF THE INVENTION

According to the present invention, there is provided a process for producing an organic-inorganic hybrid glassy material, including the sequential steps of:

(a) concentrating a starting sol of an organic-inorganic hybrid glassy material, thereby yielding a precursor material having meltability;

(b) melting the precursor material;

(c) subjecting a product of the step (b) to a heating treatment under reduced pressure; and (d) subjecting a product of the step (c) to a high-temperature heat treatment at 300° C. or higher.

According to the present invention, there is provided an organic-inorganic hybrid glassy material produced by the above process.

DETAILED DESCRIPTION

Figure 1:
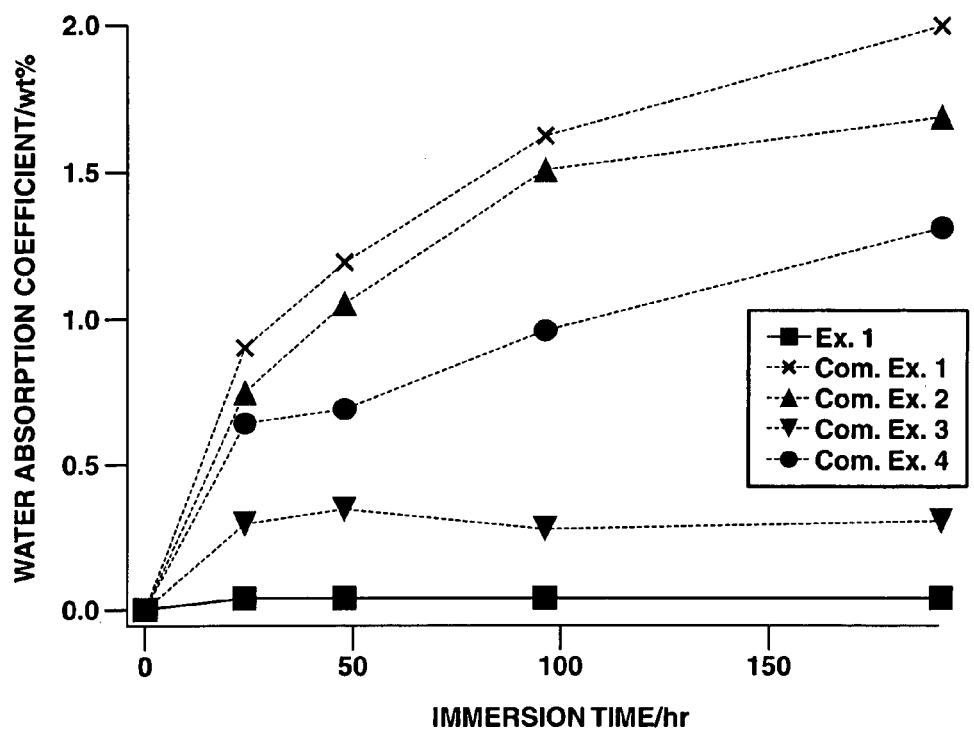
FIG. 1 is a graph showing water absorption coefficient curves according to Example 1 of the present invention and Comparative Examples 1-4.

Hitherto, the production of many low-softening materials, particularly low-melting glasses, has been carried out by melting method. Therefore, there are many restrictions for their glass compositions and, in view of melting materials for the glass raw material, low-melting glasses that can be produced are very limited.

On the other hand, when the production is carried out by sol-gel process, which is a low-temperature synthesis method, a treatment temperature of not lower than 500° C. is necessary for making the product dense. However, when the treatment is conducted at such temperature, a low-melting glass is not produced. Therefore, as a result, it has not been possible to produce a low-melting glass having good heat resistance and good airtight property. Particularly in the field of electronic materials, there have not been found low-melting glasses or low-melting materials other than glass, which cope with severe heat resistance and airtight property and with the production of low-water-absorptive and low-melting ones.

The methods that are disclosed in JP-A-62-297236, JP-A-62-223323 and JP-A-1-183438 have achievements that the material production, which could be met only by high-temperature melting, was made possible even at low temperature. They, however, cannot produce low-melting glass. It is also necessary to have a treatment at not lower than 500° C. after the sol-gel treatment. On the other hand, in a method of JP-A-7-126035, it is disclosed that a glass having a glass transition point of three hundred and several tens degrees centigrade can be produced. It is, however, not capable of producing a glass having a glass transition point lower than that without a material for making the melting point low, such as lead and bismuth.

According to the process of JP-A-2004-104455, it is possible to obtain a superior organic-inorganic hybrid glassy material that satisfies low-melting property and transparency without using a material (e.g., lead or bismuth) that provides low-melting property. In some cases, however, it may have problems such as large water absorption coefficient, large expansion coefficient, and variable refractive index. Thus, it may not be suitable in some uses.

Thus, according to the production processes up to now, it was not possible to produce a glass or glassy material that satisfies severe heat resistance and airtight property, low-water-absorptive property, low-melting characteristic, and transparency at the same time, and that has a softening temperature of 350° C. or lower, particularly 100° C. or lower, a saturated water absorption coefficient of 0.1 wt % or less, an expansion coefficient by water absorption being 0.1% or less, and a refractive index change by water absorption being 0.00030 or less.

In contrast, the present invention has made it possible to produce an organic-inorganic hybrid glassy material that has an extremely low saturated water absorption coefficient (0.1 wt % or less), no change of size and refractive index due to water absorption, and airtight property, that is high in heat resistance, chemical durability and adhesion, and that has a low melting point, which has been considered to be extremely difficult to be produced.

Such organic-inorganic hybrid glassy material according to the present invention can be applied to the field, where low-melting glass is used, such as material for sealing and coating for display parts including PDP, material for optical information communication devices including optical switch and optical connector, materials for optical instruments including LED chips, photo-functional (nonlinear) optical material and adhesive material, and to the field where organic material such as epoxy is used. It can also be used as a substitute for a glass or ceramic that endures a long time use under contact with water or under high humidity atmosphere and that generates no change of size by water absorption.

In the following, the present invention is exemplarily explained. In the present invention, the precursor material prior to the heat treatment is required to have meltability. Herein, meltability literally refers to a melting property, that is, a property by which viscosity greatly lowers by heating to achieve a so-called melted condition. Without this meltability, neither softening nor melting can be conducted. It is preferable to conduct the high-temperature heat treatment, which is conducted after the melting and the heating treatment under reduced pressure, at a temperature of 300° C. or higher.

The melting is conducted for a main purpose of homogenizing the precursor material. The heating under reduced pressure is conducted for a main purpose of slowly conducting the structural change of the precursor material as a whole. The subsequent high-temperature heat treatment is conducted for a main purpose of changing a particular bonding. A long time is necessary, if the high-temperature heat treatment temperature is lower than 300° C. With this, the industrial merit such as productivity is small. Therefore, the high-temperature heat treatment of the present invention is set at a temperature of 300° C. or higher. The high-temperature heat treatment is conducted preferably for 30 minutes to 3 hours if it is conducted at 300-400° C., and 30 minutes or less if it is conducted at 400-550° C.

It is preferable that the precursor material having meltability contains phenyl group. It is important that a metal unit having an organic functional group R, such as a silicon unit represented by $(R_nSiO_{(4-n)/2})$ (n is selected from 1, 2 and 3), is mixed into the structure of the organic-inorganic hybrid glassy material. This silicon unit is represented by a metal unit of phenyl group ($Ph_nSiO_{(4-n)/2}$), a metal unit of methyl group ($Me_nSiO_{(4-n)/2}$), a metal unit of ethyl group ($Et_nSiO_{(4-n)/2}$), a metal unit of butyl group ($Bt_nSiO_{(4-n)/2}$) (n=1-3) and the like. The metal unit of phenyl group is the most effective.

It is preferable that the precursor material having meltability contains D unit. D unit is defined as being a silicon unit under a state where, in four bonds of a silicon atom, all two or one thereof, excluding the bonds with organic substituents, is bonded to a silicon atom(s) through an oxygen atom(s). D unit is contained in an amount of preferably 15-50 mol %, more preferably 20-45 mol %, of all the silicon units. If it is less than 15 mol %, viscosity upon melting may become too high. If it is greater than 50 mol %, strength at room temperature may become insufficient.

It is preferable to conduct the high-temperature heat treatment at a temperature of 300-550° C. If the heat treatment is conducted at a temperature lower than 300° C., it requires an extremely long time. Therefore, an industrial merit is almost not recognized. On the other hand, if it exceeds 550° C., the reaction may proceed too rapidly, its control may become difficult, and a problem of coloring may occur. It is more preferably 400-525° C., still more preferably 450-500° C. It is necessary to conduct the heat treatment for a period of time to the extent that the organic functional group does not decompose. Therefore, for example, in case that the heat treatment is conducted at 400-550° C., the heat treatment time is preferably 30 minutes or shorter, more preferably 20 minutes or shorter, still preferably 10 minutes or shorter. If it exceeds 30 minutes, the organic functional group may decompose, resulting in no obtainment of a good glassy material. For example, in case that the heat treatment is conducted at a temperature of 300-400° C., the heat treatment time is preferably 3 hours or shorter. These conditions become different depending on the required specifications of saturated water absorption coefficient and light transmittance, on the kinds of organic functional groups, and on the condition that the coloring is permitted. In many cases, however, they almost become the above-mentioned conditions.

The organic-inorganic hybrid glassy material of the present invention preferably has a saturated water absorption coefficient of 0.1 wt % or less. If it is greater than 0.1 wt %, such glassy material may have a dimensional change as a result of expansion through water absorption. This dimensional change may interfere with its application to optical parts, such as lens.

The organic-inorganic hybrid glassy material of the present invention preferably is 0.1% or less in coefficient of expansion caused by water absorption. If it is greater than 0.1%, an optical lens made from the organic-inorganic hybrid glassy material may have problems of lens aberration, image distortion, focus loss, etc.

The organic-inorganic hybrid glassy material of the present invention preferably is 0.00030 or less in refractive index change by water absorption. If it is greater than 0.00030, an optical lens made from the organic-inorganic hybrid glassy material may have problems of lens aberration, image distortion, focus loss, etc.

Silanol group has high affinity for water. Thus, the organic-inorganic hybrid glassy material may have an increased water absorption coefficient by the existence of silanol group therein. The process of the present invention has a characteristic that the reaction yield of silanol group, that is, the yield related to the reaction from silanol group to siloxane bond, is extremely high. In conventional sol-gel processes, the reaction yield upon producing an organic-inorganic hybrid glass (low-melting glass) is about 95%, as a result of conducting an aging for a long time, for example, of 1,000 hours at 200° C. Hitherto, no process exceeding 95% has been known. However, in the process of the present invention, it is possible to make the reaction yield have a value close to 100% in a short time.

Accordingly, the organic-inorganic hybrid glassy material preferably has a state that the light absorption by silanol group is small. In particular, it preferably has an average transmittance of 75% or higher in 800-2100 nm by conversion into 1 mm thickness. In other words, it has a characteristic that the average transmittance in infrared region, particularly a wavelength region of 800-2100 nm, is extremely higher, as compared with conventional organic-inorganic hybrid glasses. Conventional organic-inorganic hybrid glasses in general contain organic matters. Therefore, their light transmittances in infrared region have never been high, due to light absorption by organic groups, OH group and the like. In the present invention, however, it is possible to obtain a light transmittance of 75% or higher by conversion into 1 mm thickness.

The ratio of ($D^1$ unit+$T^2$ unit) to ($D^1$ unit+$D^2$ unit+$T^1$ unit+$T^2$ unit+$T^3$ unit) is preferably 0.10 or lower. If this ratio exceeds 0.10, saturated water absorption coefficient and the amount of light absorption in infrared region increase.

Herein, $T^2$ unit refers to a state where, in four bonds of a silicon atom, two of the three thereof, excluding the bond with an organic substituent, are bonded to silicon atoms through oxygen atoms. $T^3$ unit means a state where, in four bonds of a silicon atom, all three thereof, excluding the bond with an organic substituent, are bonded to silicon atoms through oxygen atoms; and $T^1$ unit means a state where, in four bonds of a silicon atom, one of the three thereof, excluding the bond with an organic substituent, is bonded to a silicon atom through an oxygen atom. D unit includes a $D^2$ unit where, in four bonds of a silicon atom, all two thereof excluding the bonds with organic substituents are bonded to silicon atoms through oxygen atoms, or a $D^1$ unit where one of them is bonded to a silicon atom through an oxygen atom, while another is bonded to an ethoxy group or hydroxyl group. Further, in the $T^2$ unit, the state where, in four bonds of a silicon atom, two of the three thereof, excluding the bond with an organic substituent, are bonded to silicon atoms through oxygen atoms while another is an ethoxy group is named $T^2$(—OEt). Still further, in the $T^2$ unit, the state where, in four bonds of a silicon atom, two of the three thereof, excluding the bond with an organic substituent, are bonded to silicon atoms through oxygen atoms while another is hydroxyl group is named $T^2$(—OH). With regard to them, their presence and content can be confirmed, for example, by a $^{29}Si$ NMR spectroscopic method. Controlling the contents of $T^2$ unit and $D^1$ unit contributes to controlling the amount of the remaining silanol groups and to lowering saturated water absorption coefficient. Furthermore, it limits the light absorption in infrared region. As a result, it contributes to increasing the light transmittance in infrared region.

It is preferable that T unit (i.e., $T^1$, $T^2$ or $T^3$ unit) is selected from phenyltriethoxysilane, methyltriethoxysilane and ethyltriethoxysilane. It is preferable that D unit (i.e., $D^1$ or $D^2$ unit) is selected from diethoxydiphenylsilane, diethoxydimethylsilane, diethoxydiethylsilane, and diethoxymethylphenylsilane.

It is preferable that the organic-inorganic hybrid glassy material has a softening temperature of 50° C.-350° C. and meltability. If the softening temperature is less than 50° C., its chemical stability is problematic. If it exceeds 350° C., operability becomes problematic. The softening temperature tends to change depending on its treatment. It is more preferable that the final softening temperature is 100-300° C., moreover 120-280° C. At the same time, it is required to have meltability. Without this meltability, a problem occurs in many cases in terms of adhesion. The softening temperature of the organic-inorganic hybrid glassy material can be judged from TMA measurement in which the temperature has been increased at 10° C./min. In other words, the amount of shrinkage can be measured under the above condition, and the temperature, at which the change of the amount of shrinkage started, can be defined as softening temperature.

It is preferable that the reduction ratio of light transmission due to absorption of silanol group, in case that the light transmittance at 1100 nm is set as the standard, is 10% or less. If the reduction ratio of light transmittance due to absorption of silanol group exceeds 10%, for example, the selection factors in optical communication and the like decrease. Therefore, its use value diminishes. Herein, the reason why the wavelength of 1100 nm was set as the standard is that there are few substances that conduct light absorption in this region and therefore the light transmittance is relatively stable.

It is preferable to produce the organic-inorganic glassy material, as follows. That is, the starting raw material is a metal alkoxide. It is preferable to produce the glassy material by conducting a mixing step by mixing a metal alkoxide as the raw material, water, acid catalyst and alcohol, followed by the concentration step, the melting step, the heating treatment under reduced pressure, and the high-temperature heat treatment step. According to this process, its stability is also high, and the production is also possible with low cost while maintaining good quality. Herein, an important thing is meltability. The production is not possible by conventional sol-gel processes having no meltability.

The upper limit temperature for the concentration step is 100° C. or lower, even when an alcohol having a boiling point of higher than 100° C., such as 1-butanol having a boiling point of 118° C., is used. In the case of an alcohol having a boiling point of not higher than 100° C., it is desirable that the boiling point is also taken into consideration. When, for example, ethanol is used, there is a tendency that a better result is achieved when the temperature is made to be not higher than 80° C., which is its boiling point. That is likely due to the reason that, when the temperature is higher than the boiling point, alcohol suddenly evaporates whereby a homogeneous reaction is hardly achieved due to the changes of alcohol in amount and state.

It is preferable that the melting step is conducted at a temperature of 30° C. to 400° C. At a temperature of lower than 30° C., melting is substantially impossible. When it is higher than 400° C., an organic group bonded to a central (metal) atom, which forms a network, may be pyrolyzed. Therefore, a desired organic-inorganic hybrid glassy material cannot be obtained. In addition, disintegration may take place or bubbles may be formed to give non-transparency. Preferably, it is from 100° C. to 300° C.

It is preferable that, in the heating step under reduced pressure, the treatment is conducted at a temperature of 250° C. to 300° C. and under a pressure of 0.1 Torr or lower. At a temperature lower than 250° C., the reaction may not sufficiently be accelerated. When it is higher than 300° C., pyrolysis may take place and it is difficult to obtain a stable glassy material. If the pressure exceeds 0.1 Torr, there may occur a problem of remaining of bubbles. Furthermore, it may be necessary that the time required for the heating under reduced pressure is 5 minutes or longer. Although the time for the heating under reduced pressure may vary depending upon the treatment amount, the treatment temperature and the allowable residual amount of reactive hydroxyl groups (—OH), it is generally very difficult to achieve a satisfactory level when the time is shorter than 5 minutes. The productivity lowers when it is too long. Accordingly, it is preferably from 10 minutes to one week.

The heating treatment under reduced pressure and the high-temperature heat treatment are distinguished from each other in that the latter is not conducted under reduced pressure and that the temperature of the latter is higher than that of the former.

As a result of conducting the above-mentioned melting step and heating step under reduced pressure, a stabilized organic-inorganic hybrid glassy material can be prepared. In conventional sol-gel processes, there is neither the above-mentioned melting step nor the heating step under reduced pressure, and therefore it is not possible to obtain an organic-inorganic hybrid glassy material of the present invention.

It is effective to conduct the melting step by heating and the heating step under reduced pressure in an inert atmosphere. It is also effective therein to conduct microwave heating.

In conventional sol-gel processes, hydrochloric acid or nitric acid has been used as a catalyst in many cases. This was because the gellation time becomes long in the case of other catalysts. In the mixing step of the present invention, nitric acid and other acids are not preferable, but the use of hydrochloric acid or acetic acid is preferable. A more preferable one is acetic acid. Trifluoroacetic acid is also useful.

The metal alkoxide used as the raw material is an alkoxysilane replaced with an organic substituent. It is preferably selected from metal alkoxides where the organic substituent is phenyl group, methyl group, ethyl group, propyl group (n- and i-), butyl group (n-, i- and t-), pentyl group, hexyl group, octyl group, decyl group, dodecyl group, octadecyl group, mercaptomethyl group, mercaptopropyl group, 3,3,3-trifluoropropyl group, 3-trifluoroacetoxypropyl group, vinyl group, benzyl group, styryl group or the like, and where the alkoxyl group is methoxy group, ethoxy group, propoxy group (n- and i-) or the like. These are very useful raw materials for producing an organic-inorganic hybrid glassy material, particularly a transparent material having a low softening temperature at room temperature or lower. Metal alkoxides other than the above-mentioned ones may be used as well. Production is also possible so far as a material that has been used in sol-gel processes, such as metal acetylacetonate, metal carboxylate, metal nitrate, metal hydroxide and metal halide, is used.

With regard to alcohol, the representative ones are methanol, ethanol, 1-propanol, 2-propanol, 1-butanol, 2-methyl-1-propanol, 2-butanol, 1,1-dimethyl-1-ethanol, etc. although it is not limited to these.

It is also effective to use ammonia in the mixing step. Upon this, it is preferable that the ammonia to be used is 1 to 20 times that of hydrochloric acid or acetic acid by molar ratio. Each of ammonia, hydrochloric acid and acetic acid is a catalyst, a combination of ammonia and acetic acid or of ammonia and hydrochloric acid is taken, and ammonia alone does not show a good result. If the ammonia to be used in the mixing step is in an amount less than one time that of hydrochloric acid or acetic acid, the alkoxide is not completely hydrolyzed, and a large amount of $T^2$(—OEt) remains in the glass, thereby generating a problem of inferior chemical stability. On the other hand, if the amount to be used in the mixing step is in an amount larger than 20 times that of hydrochloric acid or acetic acid, the hydrolysis-polycondensation reaction proceeds rapidly, thereby generating a problem of not achieving a homogeneous reaction. More preferably, it is in a range of 2-10 times that.

Furthermore, in this case, after the melting step, it is preferable to remove the ammonium salt through a pulverization/washing step. If an ammonium salt exists, a stable organic-inorganic hybrid glassy material may not be obtained.

Although all of the organic-inorganic hybrid glassy materials produced by the above process are naturally targets of the present invention, they are organic-inorganic hybrid glassy materials that are partially or completely formed with a random network structure.

The following nonlimitative examples are illustrative of the present invention.

EXAMPLE 1

As starting materials, there were used metal alkoxides, phenyltriethoxysilane (PhSi(OEt)$_3$) and diethoxydiphenylsilane (Ph$_2$Si(OEt)$_2$). At first, as the mixing step, a catalyst, acetic acid, was added at room temperature to phenyltriethoxysilane of 10 ml, water of 45 ml, and ethanol of 20 ml. As the heating reaction step, stirring was conducted at 60° C. for 1 hour. Then, 3 ml of diethoxydiphenylsilane was added, followed by stirring at 60° C. for 2 hours. These stirrings at 60° C. can also be considered as the concentration of the present invention. Then, melting was conducted at 150° C. by spending 5 hours, followed by heating at 250° C. for 1 hour under a reduced pressure that was less than 0.1 Torr (corresponding to the minimum mark of a pressure gage) and close to 0 Torr and then cooling to room temperature, thereby obtaining a transparent precursor material. This reduced pressure is assumed to be around 0.01 Torr. Furthermore, this precursor material was subjected to a high-temperature heat treatment at 400° C. for 5 minutes, thereby obtaining a transparent material of 1.452 mm in thickness.

This transparent material was subjected to a saturated water absorption coefficient measurement at 23° C. in accordance with Japanese Industrial Standard (JIS) K 7209. With this, it was found to be about 0.04 wt %, as shown in FIG. 1. The thickness of the sample did not change by the water absorption test. It was 1.452 mm before and after the water absorption test. Refractive indexes of the sample before and after the water absorption test were respectively 1.58141 and 1.58144 at a wavelength of 632.8 nm. The difference between these values was less than 0.00030.

Figure 2:
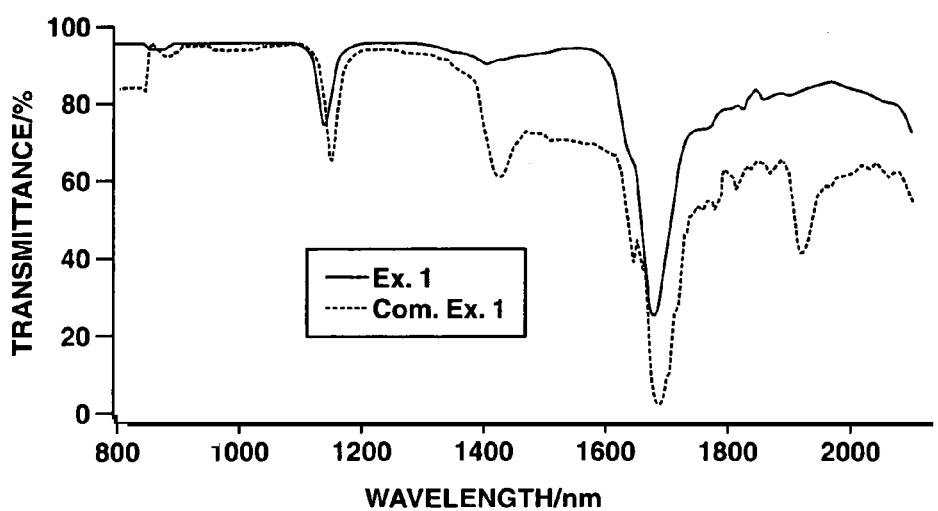
FIG. 2 is a graph showing light transmittance curves in wavelengths of 800-2100 nm according to Example 1 of the present invention and Comparative Example 1.

The transparent material was subjected to a light transmittance measurement in a wavelength region of 800-2100 nm by a Hitachi U3500 type automatic recording spectrophotometer. The result is shown in FIG. 2. In this region of 800-2100 nm, the light absorption has greatly decreased. In particular, the decrease of the light transmittance by absorption (about 1410 nm) of silanol group was as very small as 5% or less. Therefore, the light transmission has greatly increased, and the average light transmittance in 800-2100 nm was about 86%.

Softening temperature of this transparent material was 124° C., which was lower than about 500° C., the decomposition temperature of phenyl group.

Figure 3:
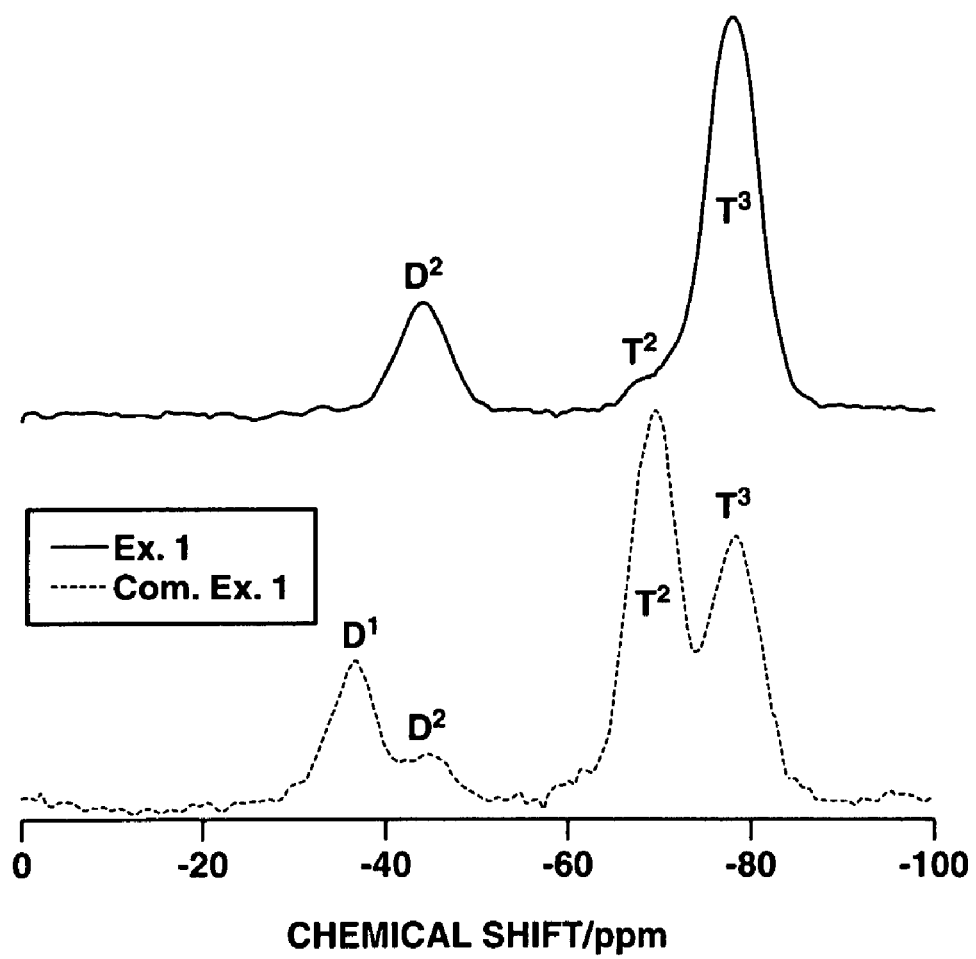
FIG. 3 is a chart showing $^{29}Si$ NMR spectra according to Example 1 of the present invention and Comparative Example 1.

The bonding condition of the transparent material after the 400° C. heat treatment was measured by a CMX-400 type magnetic resonance measurement apparatus of JEOL Ltd. (Tokyo, Japan). The result is shown in FIG. 3. In the drawing, positions shown as $T^2$, $T^3$, and $D^2$ correspond to chemical shifts of respective units. The ratio of $T^2$ unit to ($D^2$ unit+$T^2$ unit+$T^3$ unit) was 0.01 after the 400° C. heat treatment, and it is understood that the value is extremely small. In view of the fact that it was possible to confirm the random network structure, the transparent material prepared is judged as a material having an organic-inorganic hybrid glass structure, that is, an organic-inorganic hybrid glassy material according to the present invention. Softening point of the organic-inorganic hybrid glassy material was judged from a TMA measurement by raising the temperature at 10° C./minute. That is, the softening behavior was determined from the change of the amount of shrinkage under the above condition, and the starting temperature thereof was defined as softening temperature.

EXAMPLE 2

Example 1 was almost repeated except in that the high-temperature heat treatment was conducted at 300° C. for 2 hr, thereby obtaining a transparent material having a thickness of 1.525 mm.

This transparent material was subjected to a saturated water absorption coefficient measurement at 23° C. in the same manner as that of Example 1. With this, it was found to be about 0.04 wt %. The thickness of the sample did not change by the water absorption test. It was 1.525 mm before and after the water absorption test. Refractive indexes of the sample before and after the water absorption test were respectively 1.58319 and 1.58335 at a wavelength of 632.8 nm. The difference between these values was less than 0.00030.

The transparent material was subjected to a light transmittance measurement in 800-2100 nm in the same manner as that of Example 1. The decrease of the light transmittance by absorption (about 1410 nm) of silanol group was as very small as 6%. Therefore, the light transmission has increased, and the average light transmittance in 800-2100 nm was about 75%.

Softening temperature of this transparent material was 150° C., which was lower than about 500° C., the decomposition temperature of phenyl group.

The bonding condition of the transparent material after the 300° C. heat treatment was measured in the same manner as that of Example 1. The ratio of $T^2$ unit to ($D^2$ unit+$T^2$ unit+$T^3$ unit) was 0.05 after the 300° C. heat treatment, and it is understood that the value is extremely small. In view of the fact that it was possible to confirm a random network structure, the transparent material prepared is judged as a material having an organic-inorganic hybrid glass structure, that is, an organic-inorganic hybrid glassy material according to the present invention.

COMPARATIVE EXAMPLE 1

Example 1 was almost repeated except in that the heating treatment under reduced pressure and the high-temperature heat treatment were omitted, thereby obtaining a transparent material. Since this material was deformed by a load of 1 g or greater at room temperature, it was not possible to accurately measure the thickness.

This transparent material was subjected to a water absorption coefficient measurement at 23° C. in the same manner as that of Example 1. With this, as shown in FIG. 1, it was not saturated even at 192 hours in the test, at which the water absorption coefficient exceeded 1.9 wt %. Refractive indexes of the sample before and after the water absorption test were respectively 1.57994 and 1.57823 at a wavelength of 632.8 nm. The difference between these values was greater than 0.00030.

The transparent material was subjected to a light transmittance measurement in the same manner as that of Example 1. With this, as shown in FIG. 2, the average light transmittance in 800-2100 nm was about 73%, and the decrease of the light transmittance by absorption (about 1410 nm) of silanol group was 30%.

Softening temperature of this transparent material was 47° C. The bonding condition of the transparent material was measured in the same manner as that of Example 1. As a result, as shown in FIG. 3, the ratio of ($D^1$ unit+$T^2$ unit) to ($D^1$ unit+$D^2$ unit+$T^2$ unit+$T^3$ unit) was 0.63.

COMPARATIVE EXAMPLE 2

An acrylic resin plate having widths of 1 cm and a thickness of 1.073 mm was subjected to a saturated water absorption coefficient measurement in the same manner as that of Example 1. With this, it was found to be 1.6 wt %, as shown in FIG. 1. The thicknesses of the sample before and after the water absorption test were respectively 1.073 mm and 1.077 mm, resulting in 0.4% increase by water absorption. Refractive indexes of the sample before and after the water absorption test were respectively 1.48968 and 1.49053 at a wavelength of 632.8 nm. The difference between these values was greater than 0.00030.

COMPARATIVE EXAMPLE 3

A polycarbonate resin plate having widths of 1 cm and a thickness of 1.004 mm was subjected to a saturated water absorption coefficient measurement in the same manner as that of Example 1. With this, it was found to be 0.3 wt %, as shown in FIG. 1. The thicknesses of the sample before and after the water absorption test were respectively 1.004 mm and 1.007 mm, resulting in 0.3% increase by water absorption. Refractive indexes of the sample before and after the water absorption test were respectively 1.58195 and 1.58226 at a wavelength of 632.8 nm. The difference between these values was greater than 0.00030.

COMPARATIVE EXAMPLE 4

An epoxy resin plate having widths of 1 cm and a thickness of 0.800 mm was subjected to a saturated water absorption coefficient measurement in the same manner as that of Example 1. With this, as shown in FIG. 1, it was not saturated even at 192 hr in the test, at which the water absorption coefficient exceeded 1.3 wt %. The thicknesses of the sample before and after the water absorption test were respectively 0.800 mm and 0.806 mm, resulting in 0.8% increase by water absorption. Refractive indexes of the sample before and after the water absorption test were respectively 1.51449 and 1.51682 at a wavelength of 632.8 nm. The difference between these values was greater than 0.00030.

What is claimed is:

1. A process for producing an organic-inorganic hybrid glassy material, comprising the sequential steps of:
   (a) concentrating a starting sol of an organic-inorganic hybrid glassy material, thereby yielding a precursor material having meltability;
   (b) melting the precursor material;
   (c) subjecting a product of the step (b) to a heating treatment under reduced pressure; and
   (d) subjecting a product of the step (c) to a high-temperature heat treatment at 300° C. or higher; wherein:
   step (d) is not conducted under reduced pressure and is carried out at a temperature higher than that of step (c),
   the precursor material of step (a) comprises a D unit in which, of the four bonds which can be made to a silicon atom, excluding two bonds to organic substituents, one or both of the remaining bonds is/are bonded to another silicon atom through an oxygen atom; and
   the process provides the organic-inorganic hybrid glassy material with a numeral ratio of ($D^1$ unit+$T^2$ unit) to ($D^1$ unit+$D^2$ unit+$T^1$ unit+$T^2$ unit+$T^3$ unit) of 0.10 or less; where:
   a $T^1$ unit is a unit in which, of the four bonds which can be made to a silicon atom, excluding one bond to an organic substituent, one of the remaining three bonds is bonded to a another silicon atom through an oxygen atom;
   a $T^2$ unit is a unit in which, of the four bonds which can be made to a silicon atom, excluding one bond to an organic substituent, two of the remaining three bonds are bonded to other silicon atoms through oxygen atoms;
   a $T^3$ unit is a unit in which, of the four bonds which can be made to a silicon atom, excluding one bond to an organic substituent, all three of the remaining three bonds are bonded to other silicon atoms through oxygen atoms;
   a $D^1$ unit is a unit in which, of the four bonds which can be made to a silicon atom, excluding two bonds to organic substituents, one of the remaining two bonds is bonded to another silicon atom through an oxygen atom, and
   a $D^2$ unit is a unit in which, of the four bonds which can be made to a silicon atom, excluding two bonds to organic substituents, both of the remaining two bonds are bonded to other silicon atoms through oxygen atoms.

2. A process according to claim 1, wherein the precursor material of the step (a) comprises a phenyl group.

3. A process according to claim 1, wherein the heating treatment under reduced pressure is conducted at a temperature of 250-300° C.

4. A process according to claim 1, wherein the high-temperature heat treatment of the step (d) is conducted at a temperature of 300-550° C.

5. An organic-inorganic hybrid glassy material produced by a process according to claim 1, wherein the numeral ratio of ($D^1$ unit+$T^2$ unit) to ($D^1$ unit+$D^2$ unit+$T^1$ unit+$T^2$ unit+$T^3$ unit) is 0.10 or less; where:
   a $T^1$ unit is a unit in which, of the four bonds which can be made to a silicon atom, excluding one bond to an organic substituent, one of the remaining three bonds is bonded to another silicon atom through an oxygen atom;
   a $T^2$ unit is a unit in which, of the four bonds which can be made to a silicon atom, excluding one bond to an organic substituent, two of the remaining three bonds are bonded to other silicon atoms through oxygen atoms;
   a $T^3$ unit is a unit in which, of the four bonds which can be made to a silicon atom, excluding one bond to an organic substituent, all three of the remaining three bonds are bonded to other silicon atoms through oxygen atoms;
   a $D^1$ unit is a unit in which of the four bonds which can be made to a silicon atom, excluding two bonds to organic substituents, one of the remaining two bonds is bonded to another silicon atom through an oxygen atom, and
   a $D^2$ unit is a unit in which, of the four bonds which can be made to a silicon atom, excluding two bonds to organic substituents, both of the remaining two bonds are bonded to other silicon atoms through oxygen atoms.

6. An organic-inorganic hybrid glassy material according to claim 5, which has a saturated water absorption coefficient of 0.1 weight % or less.

7. An organic-inorganic hybrid glassy material according to claim 5, which is 0.1% or less in expansion coefficient by water absorption.

8. An organic-inorganic hybrid glassy material according to claim 5, which is 0.00030 or less in refractive index change by water absorption.

9. An organic-inorganic hybrid glassy material according to claim 5, which has a softening temperature of 50-350° C. and meltability.

10. An organic-inorganic hybrid glassy material according to claim 5, wherein a reduction rate of light transmittance due to absorption of a silanol group is 10% or less, in case that light transmittance at 1100 nm is set as a standard.

11. An organic-inorganic hybrid glassy material according to claim 5, which is partially or completely formed with a random network structure.

12. An organic-inorganic hybrid glassy material according to claim 5, which comprises a phenyl group.

13. A process according to claim 1, wherein the heating treatment under reduced pressure of the step (c) is conducted at a temperature of 250-300° C. under a pressure of 0.1 Torr or lower for 5 minutes or longer.

* * * * *